(12) United States Patent
Stubblefield et al.

(10) Patent No.: US 7,267,067 B2
(45) Date of Patent: Sep. 11, 2007

(54) APPARATUS AND METHOD FOR REDUCING FLUID DRAG ON A SUBMERGED SURFACE

(75) Inventors: Donald P. Stubblefield, Lake Oswego, OR (US); Jerry D. Stubblefield, Lake Oswego, OR (US)

(73) Assignee: North Shore Partners, Lake Oswego, OR (US)

( * ) Notice: Subject to any disclaimer, the term of this patent is extended or adjusted under 35 U.S.C. 154(b) by 0 days.

(21) Appl. No.: 10/905,751

(22) Filed: Jan. 19, 2005

(65) Prior Publication Data

US 2006/0156965 A1  Jul. 20, 2006

(51) Int. Cl.
*B63B 1/38* (2006.01)
*B64C 3/00* (2006.01)
(52) U.S. Cl. .................................... 114/67 A; 244/207
(58) Field of Classification Search ............. 114/67 A; 244/204, 207–210
See application file for complete search history.

(56) References Cited

U.S. PATENT DOCUMENTS 5,452,676 A    9/1995   Fiore
6,125,781 A    10/2000  White
6,789,491 B2 * 9/2004   Takahashi et al. ........ 114/67 A
2001/0022152 A1 9/2001  Takahashi
2002/0029731 A1 * 3/2002 Takahashi ................. 114/67 A
2003/0097971 A1 5/2003  Takahashi

FOREIGN PATENT DOCUMENTS

JP          60025598 U    2/1985

OTHER PUBLICATIONS

PCT International Search Report for International Application No. PCT/US2006/009978 and Written Opinion of the International Searching Authority, mailed Oct. 24, 2006.

* cited by examiner

*Primary Examiner*—Jesus D Sotelo
(74) *Attorney, Agent, or Firm*—Design IP

(57) ABSTRACT

An apparatus and method for reducing surface friction drag on the hull of a surface vessel by entraining air into water flowing in the boundary layer flow along the hull. The apparatus creates a reduced pressure region by diverting a first portion of the flow away from the surface of the hull. An air pocket is formed in the reduced pressure region and a second portion of the flow is directed through the air pocket by nozzles, which acts as a plunging jet and entrains air into the boundary layer.

27 Claims, 9 Drawing Sheets

US 7,267,067 B2

APPARATUS AND METHOD FOR REDUCING FLUID DRAG ON A SUBMERGED SURFACE

BACKGROUND OF THE INVENTION

The invention relates to devices and methods for reducing surface friction drag on the hull of a vessel traveling through water.

Surface friction drag or "skin friction" drag is a significant component of the total power required to propel a surface vessel through water. Reducing surface friction drag enables vessels to travel at higher speeds and/or more efficiently. Accordingly, reducing surface friction drag has been the subject of a great deal of research in the field of vessel hull design for both surface and submerged vessels.

The magnitude of surface friction drag on a particular vessel hull depends, in part, upon the viscosity of the liquid through which the hull is traveling (usually fresh or salt water), the density of the liquid and the surface tension between the liquid and the submerged surface of the hull.

As shown schematically in FIG. 2, the effects of surface friction drag are focused in a "boundary layer" 22, a layer of liquid in which momentum is transferred from the surface 16 of the hull 14 to the liquid 12. Momentum transfer is the greatest in the portion of the liquid that is closest to the surface 16 of the hull 14 and decreases to the edge 26 of the boundary layer 22. Momentum transfer in the boundary layer 22 results in a reduction in the velocity of the water 12 relative to the surface 16 of the hull 14, as well as turbulence. A velocity gradient 24 shows the decrease in relative velocity of the water 12 from the edge of the boundary layer 26 to the surface 16 of the hull 14. Relative velocity is represented by the length of each arrow.

One means of reducing surface friction drag is the introduction of a gas into the boundary layer 22, which reduces the fluid density and viscosity in the boundary layer 22. The relatively low density and viscosity of the gas results in less momentum transfer, and therefore, less surface friction drag. This technique is sometimes referred to in the art as "air lubrication".

Air lubrication has been successfully implemented in hovercraft, in which the vessel sits atop a large cushion of air. Air cushions are not practical for use with vessels having a significant draft, however, because water pressure increases with depth, which causes the air cushion to quickly rise to the surface of the water. Enormous amounts of power are required to push an air cushion down into a few inches of water. This problem has been addressed, in part, by using small bubbles of air (i.e., micro-bubbles) instead of a larger air cushion. Small bubbles rise much more slowly in water than a large air cushion.

Full-scale use of micro-bubbles has been proven very difficult. The inventions of the prior art have faced three major technical challenges in successful use of micro-bubbles to reduce surface friction: (1) injecting micro-bubbles at a sufficient volumetric rate to fill a significant portion of the boundary layer, (2) keeping the micro-bubbles from migrating out of the boundary layer, and (3) adjusting the volumetric flow rate of micro-bubbles as the velocity of the vessel changes.

Most prior art air lubrication systems use either a pump or pressurized air to supply the volume of micro-bubbles. This approach is deficient in several respects. Firstly, power must be expended to pump or pressurize the air. In all cases, the power expended to pump or pressurize the air completely offsets the power savings from reduced surface friction drag.

Secondly, it is very difficult to inject pumped or pressurized air into the boundary layer. A typical boundary layer is only a few millimeters thick near the bow of the vessel, which is where the air is injected in most prior art systems. Given that the micro-bubbles themselves are at least one millimeter in diameter and are typically injected at an angle to the direction of flow F of the boundary layer, it is very difficult to prevent the micro-bubbles from passing through the boundary layer and into the free-flow water area. Thirdly, the prior art does not provide for an injection flow rate for micro-bubbles that varies in proportion to the vessel's speed. This results in the micro-bubble injection rate being ideal at only one speed. At all other speeds, the injection rate is higher or lower than the ideal rate.

Other prior art air lubrication systems, such as the system described in U.S. Pat. No. 6,125,781, purport to aerate water flow into the boundary layer of a vessel hull using a tube that has one or more ports on the submerged surface of the vessel hull and is open to the air at the opposite end. In such prior art systems, it is hypothesized that air will be "sucked" through the port(s) and into the boundary layer. This hypothesis is based on flawed assumptions. It has been determined that these types of systems only work on vessels with very shallow drafts, traveling at high speeds. For example, air would not begin to be sucked into the boundary layer along the hull of a vessel having a draft of 3.973 inches until the vessel reached a speed 90.6 miles per hour. This is not a feasible speed for most surface vessels.

Another prior art system for reducing surface drag is referred to in the art as a ventilated step chine, which is used primarily in high-performance watercraft. An example of a ventilated step chine design is described in U.S. Pat. No. 5,452,676. Although ventilated step chines appear to provide some performance and efficiency improvements, the ventilated step chines of the prior art do not entrain significant amounts of air into the boundary layer. This is due, in part, to the fact that the ventilated step chines of the prior art do not produce turbulent mixing of air and water in the vicinity of the step. Conventional ventilated step chines merely reduce the effective surface area of the hull, so that the frictional effects of water act on a smaller area. The reduction is only a small percentage of the total surface area of the hull; therefore, ventilated step chines provide little, if any, surface friction reduction.

Accordingly, there is a need for an efficient air lubrication system that is capable of entraining air bubbles into the boundary layer of a wide variety of vessels, including those having a substantial draft and a system that functions at much more reasonable speeds.

SUMMARY OF THE INVENTION

The invention comprises an apparatus that entrains a secondary fluid into a primary fluid flow while the primary fluid flows in a boundary layer that is adjacent to a surface of an object moving through the primary fluid. The apparatus comprises a flow diverting member that diverts a first portion of the primary fluid away from the surface of the object, which results in a reduced pressure region located between the first portion of the primary fluid and the surface of the object. The apparatus also includes an opening that enables the secondary fluid to flow into the reduced pressure region, an inlet through which a second portion of the primary fluid flows and an array of nozzles located downstream from the inlet. The second portion of the primary fluid is accelerated as it passes through the nozzles. The nozzles are oriented to direct the second portion of the primary fluid through the reduced pressure region so that at least a portion of the secondary fluid is entrained into a portion of the primary fluid.

In another respect, the invention comprises a method for reducing frictional drag on a hull of an object designed to be propelled through a primary fluid, where the hull includes a surface that is at least partially submerged in the primary fluid. The method comprises first diverting a first portion of the primary fluid away from the surface of the object, which results in a reduced pressure region located between the first portion of the primary fluid and the surface of the object. An opening is provided that enables a secondary fluid to flow into the reduced pressure region, the secondary fluid having a lower density than the primary fluid. At least a portion of the secondary fluid is entrained into a portion of the primary fluid by directing a second portion of the primary fluid through the reduced pressure region.

DETAILED DESCRIPTION OF THE PREFERRED EMBODIMENT(S)

Figure 1:
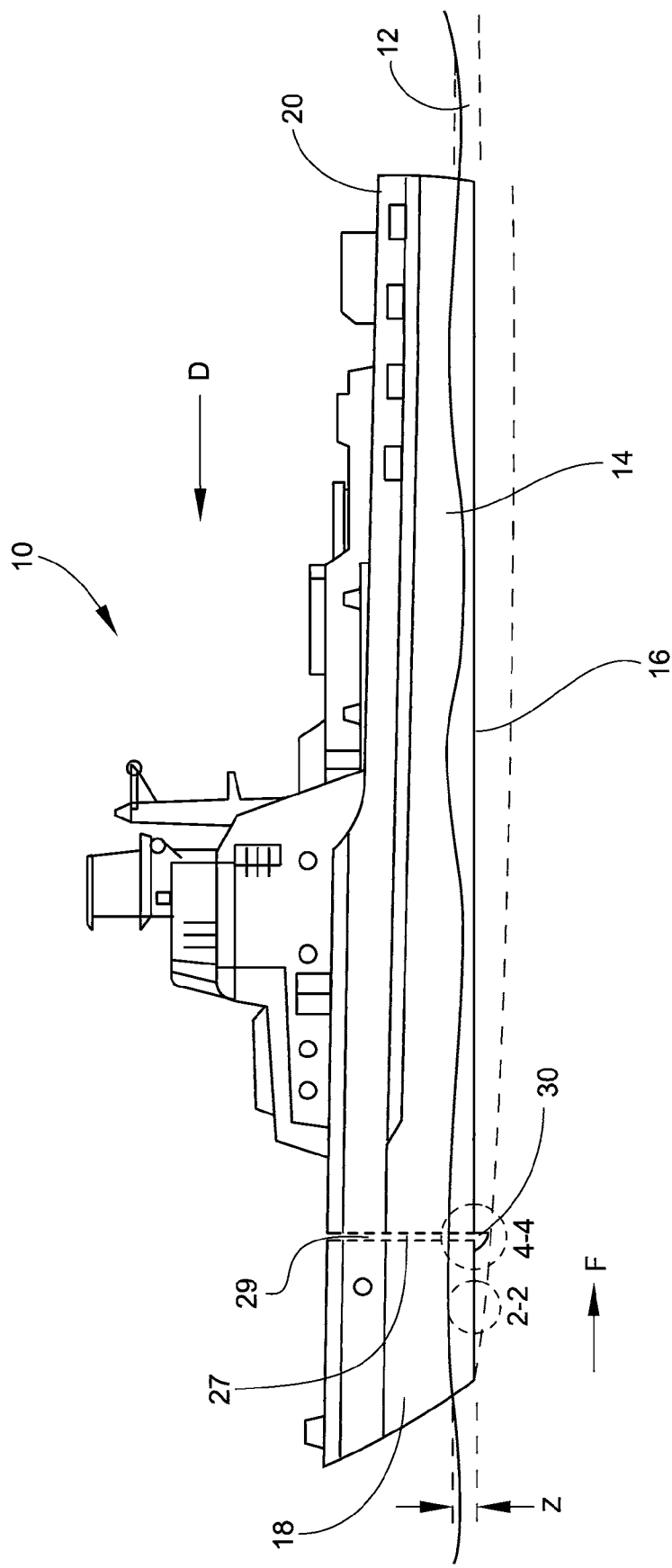
FIG. 1 shows a vessel moving in a body of water in a direction of propulsion D.
Figure 2:
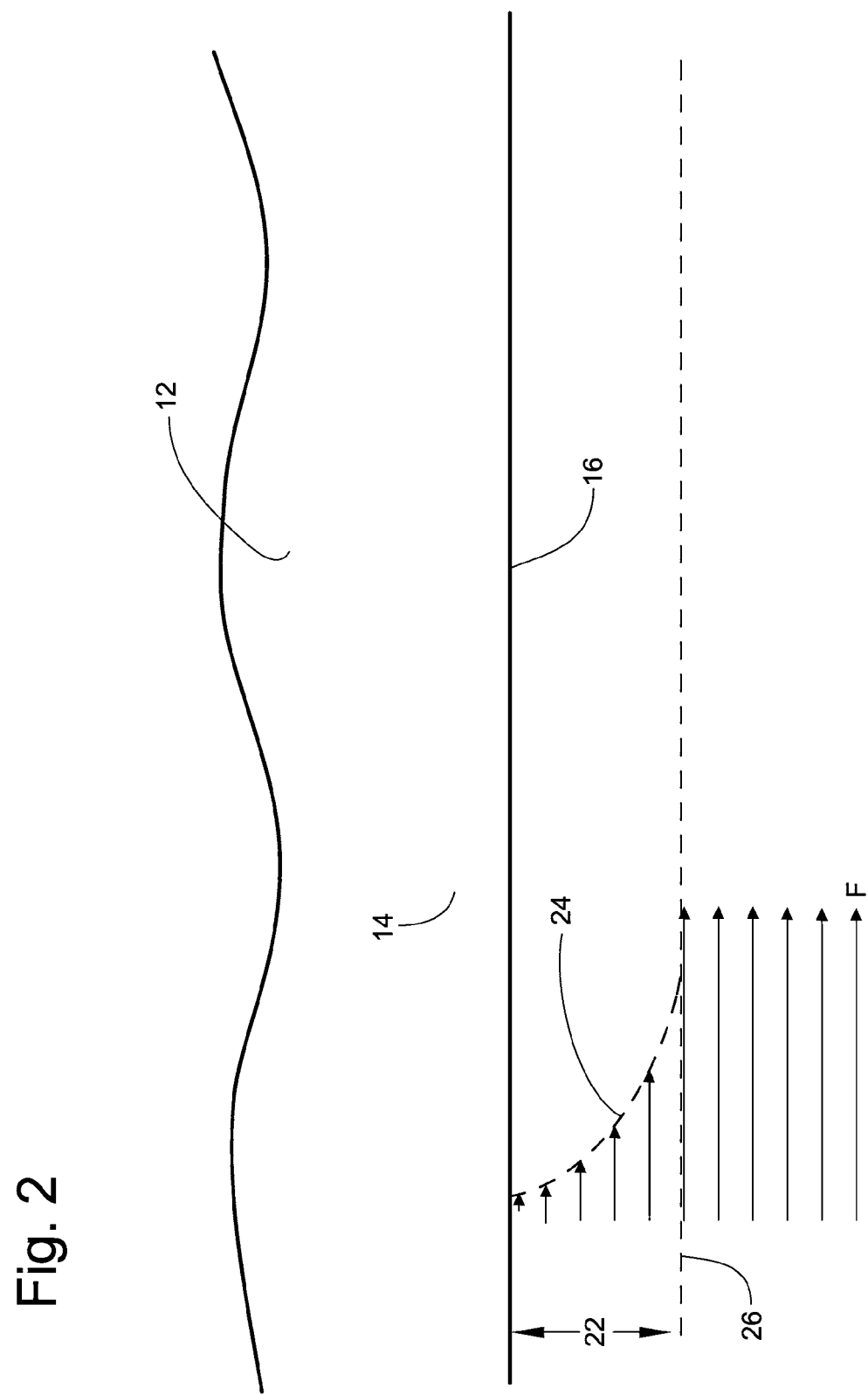
FIG. 2 shows the detail area 2-2 from FIG. 1.

The principles and operation of the entrainment device according to the present invention are better understood with reference to the drawings and the accompanying description. In order to aid in understanding of the invention, reference numerals that are referred to in the specification with respect to one or more figures may appear in additional figures without a specific reference to such additional figures in the specification. Terms used herein and in the claims to describe the relative position of elements of the invention, such as "above" and "below," are intended to refer to the invention in the orientation shown in FIGS. 4, 7 and 9.

Figure 3:
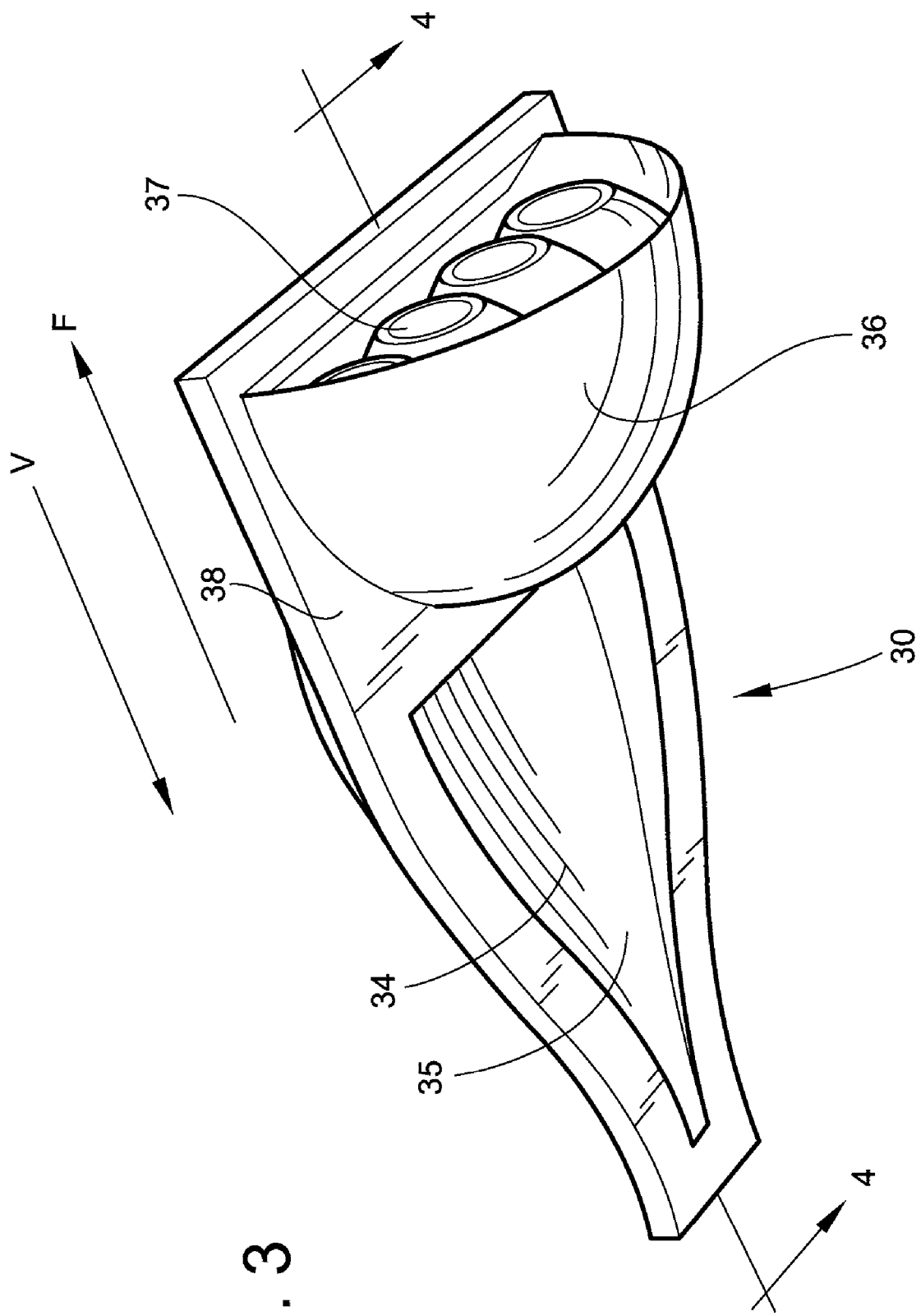
FIG. 3 shows a view from the underside of a first embodiment of an entrainment device.
Figure 4:
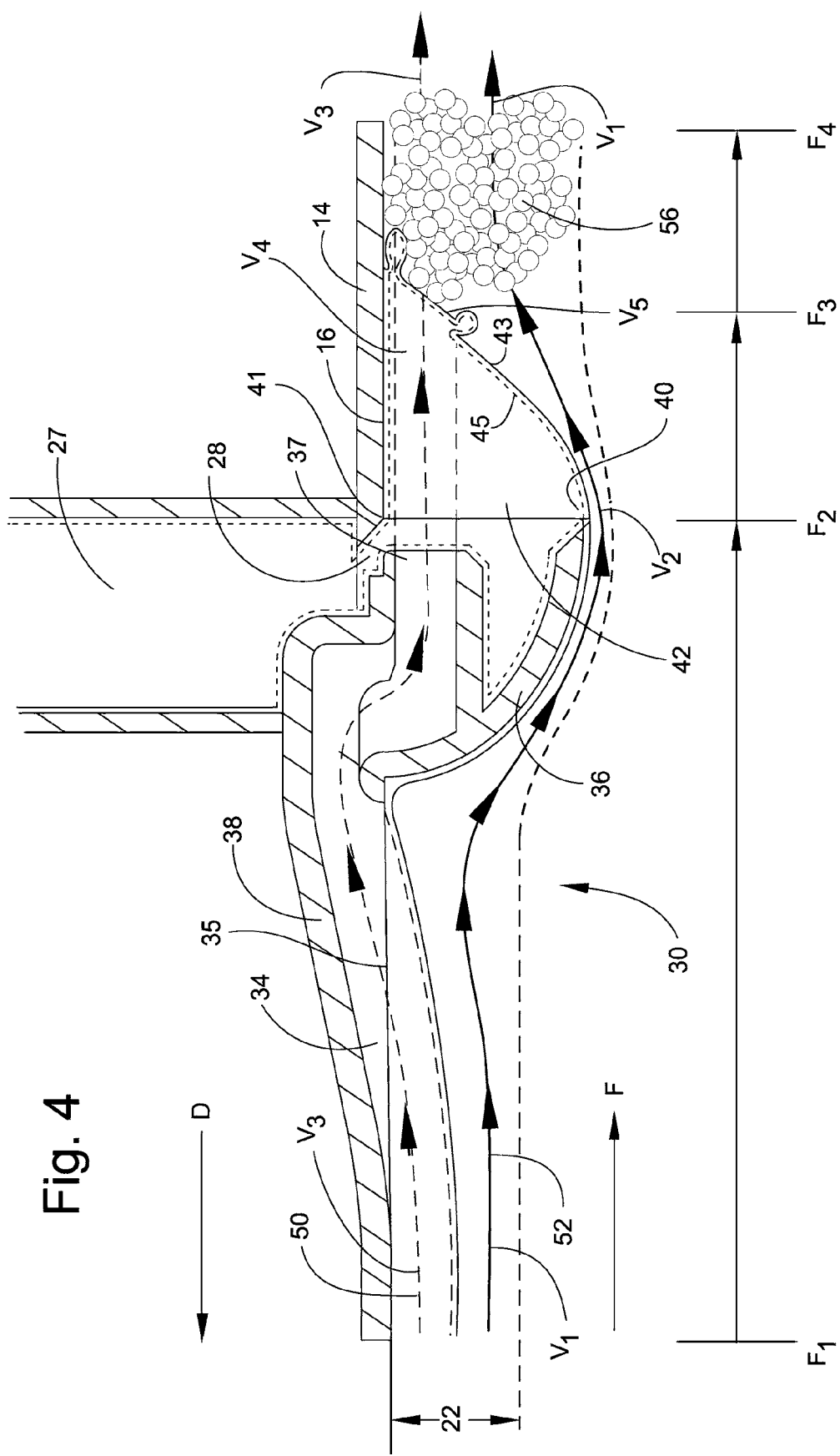
FIG. 4 shows a sectional view taken along line 4-4 of FIG. 3.

Referring to FIGS. 3 and 4, reference numeral 30 refers generally to an entrainment device 30 of the present invention. The entrainment device 30 can either be formed as part of the hull 14 of the vessel 10 or retrofitted to an existing hull. The entrainment device 30 comprises an inlet 34, a flow diverting member 36, a plurality of nozzles 37 and a base 38. As used in the specification and claims, the term "nozzle" is intended to mean a device that directs flow of a fluid and not intended to be limited to nozzles that change the velocity of the fluid.

Because this embodiment of the entrainment device 30 will be submerged and is part of a vessel 10 which will be moving in open waterways, the entrainment device 30 should be designed to resist corrosion and be sufficiently durable to withstand moderate impacts from small objects. Accordingly, the entrainment device 30 is preferably made from metal having anti-corrosive properties or rigid plastic.

The entrainment device 30 is designed to be located along the hull 14 of the vessel 10, preferably close to the bow 18 of the vessel 10, as shown in FIG. 1. As will be explained herein, surface friction reduction benefits are realized downstream from the entrainment device 30. Therefore, placing the entrainment device 30 close to the bow of the vessel 10 maximizes the beneficial effects of the entrainment device 30.

FIG. 4 shows the entrainment device 30 attached to the hull 14 and protruding downwardly from the lower surface 16 of the hull 14 into the boundary layer 22. As shown in FIG. 4, water is flowing in the direction F. Water flowing toward the entrainment device 30 in the boundary layer 22 is represented in a simplified fashion in FIG. 4 as two portions of the boundary layer flow: an inlet flow stream 50 and a diverted flow stream 52.

As water approaches the inlet 34, the inlet flow portion 50 is drawn into the inlet 34 through an opening 35 and is directed through the nozzle 37. The shape of the inlet 34 may vary depending upon the draft and normal operating speed of the vessel 10, but is preferably shaped to minimize drag. It has been found that low drag inlet shapes in accordance with guidelines set forth by the National Advisory Committee on Aeronautics (NACA) are suitable.

The diverted flow stream 52 is directed downwardly by the flow diverter 36 and separated from the inlet flow stream 50. Separation of streams 50 and 52 occurs between points $F_1$ and $F_2$. Maximum flow separation occurs at point $F_2$, where the diverted flow stream 52 passes over a trailing edge 40 of the flow diverter 36. The velocity of the diverted flow stream 52 is also increased as it flows over the flow diverter 36.

In order for flow separation to occur, the trailing edge 40 of the flow diverter 36 must extend into the water further than the portion of the surface 16 of the hull 14 that is immediately downstream from the trailing edge 40 of the flow diverter 36. This portion of the surface 16 of the hull 14 is referred to herein and in the claims as the downstream leading edge 41 of the hull 14.

Figure 8:
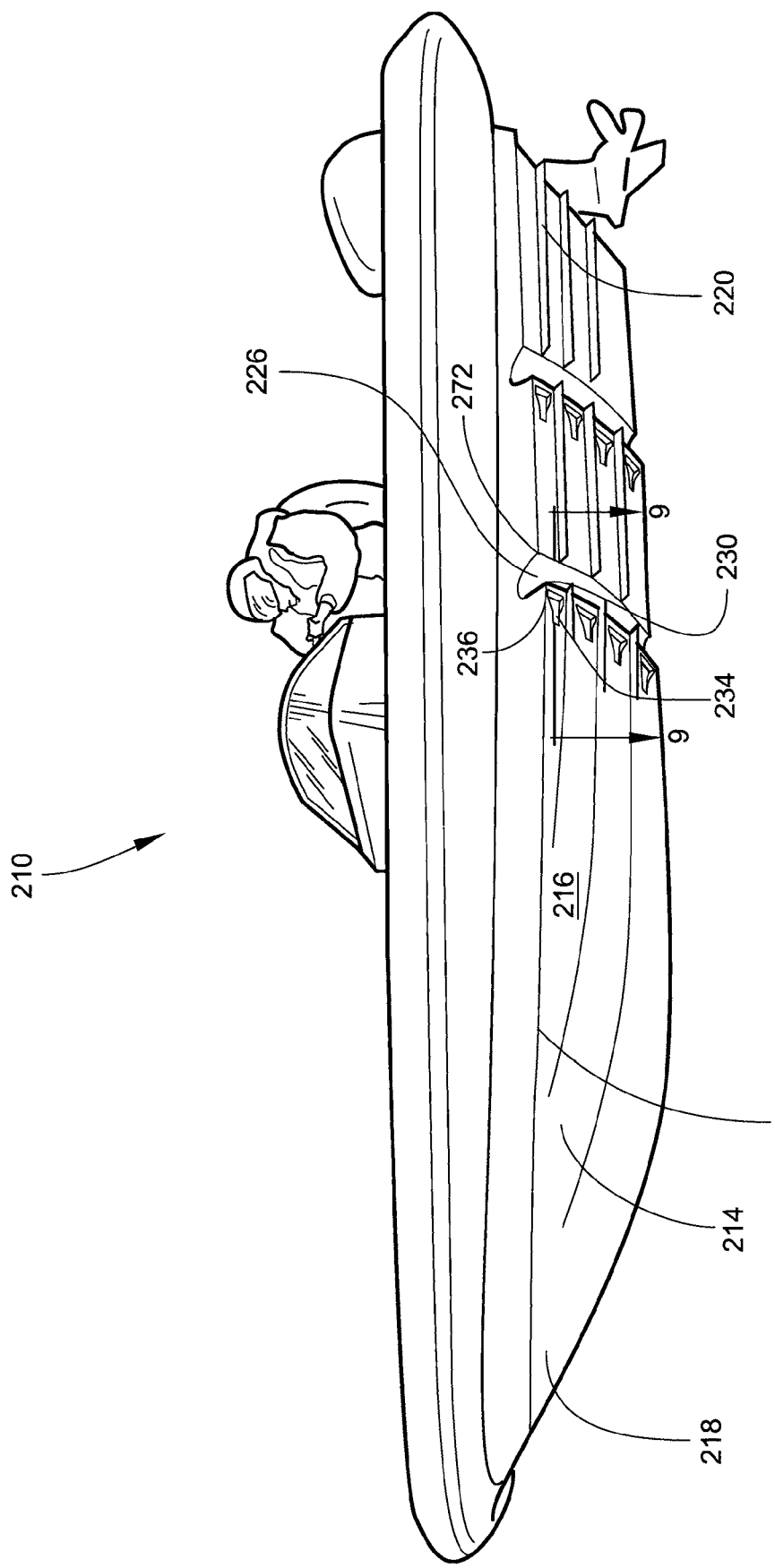
FIG. 8 shows a watercraft that incorporates a third embodiment of the entrainment device, shown from the underside and rear.
Figure 9:
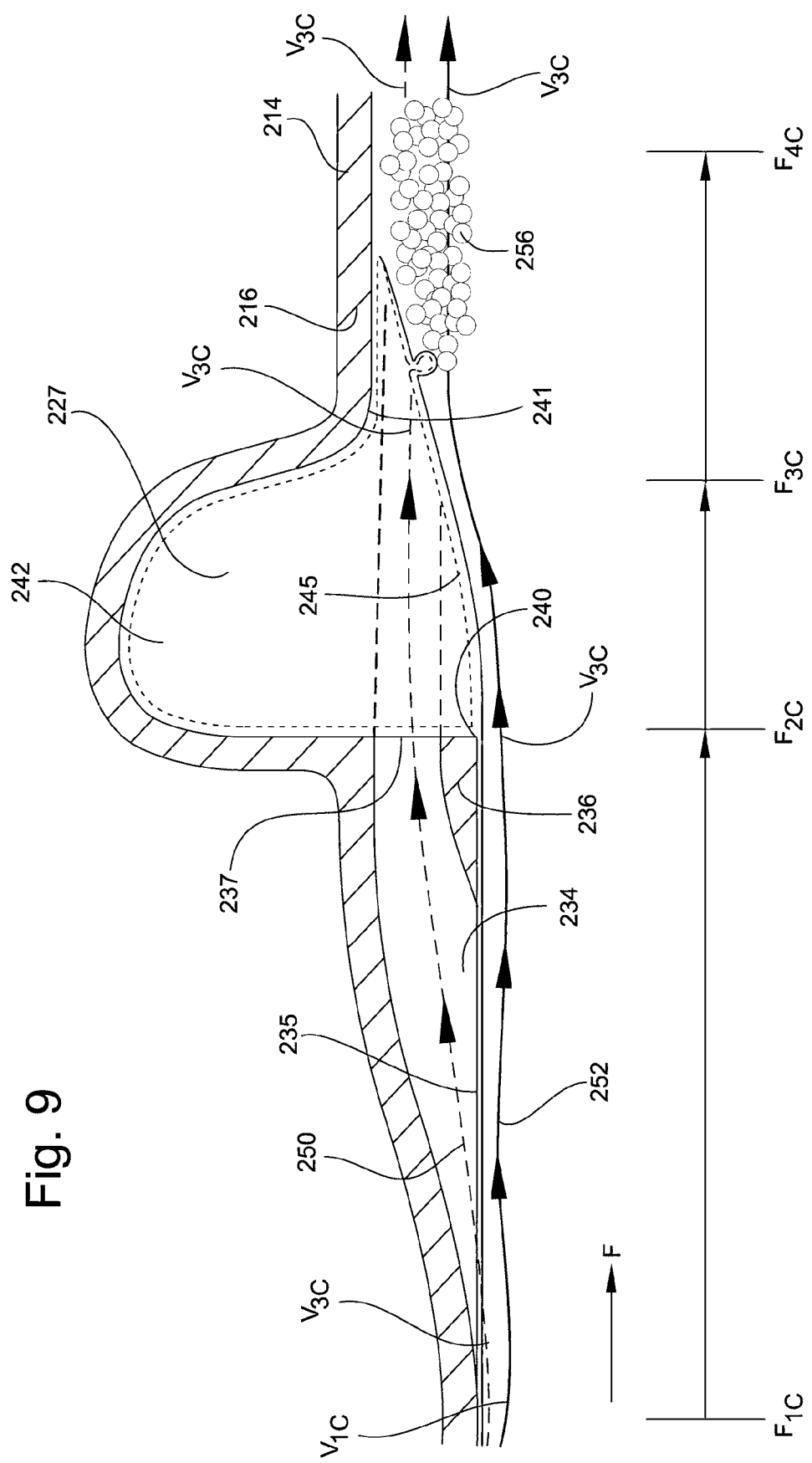
FIG. 9 shows a sectional view thereof taken along line 9-9 of FIG. 8.

In this embodiment of the invention, the flow diverter 36, including the trailing edge 40, protrudes downwardly from the hull 14. Alternatively, the downstream leading edge 41 of the hull 14 could be recessed relative to the trailing edge 40 of the flow diverter 36. This alternative configuration is shown in FIGS. 8 & 9, which are discussed herein.

The flow separation and increased velocity of flow results in a reduced pressure region located between the trailing edge 40 and the vessel hull 14 at point $F_2$. A vent 27 is provided that is open to the air at its upper end (not shown). The vent 27 includes an opening 28 located downstream from the nozzle 37. The reduced pressure region provided by the diversion of the diverted flow 52 allows a pocket of air 42 to be drawn down into the reduced pressure region. As used herein the term "region" and "reduced pressure region" should be understood to mean a three-dimensional region, i.e., a volume.

Between points $F_2$ and $F_3$, there is an area in which the pocket of air 42 abuts the surface 43 of the diverted flow stream 52. This area will be referred to herein and in the claims as a "free surface" 45.

The nozzle 37 preferably increases the velocity of the inlet flow stream 50 to an exit velocity $V_4$ and directs the inlet flow stream 50 through the pocket 42 of air. The inlet flow stream 50 then impinges the free surface 45. This causes the inlet flow stream 50 to act as a plunging jet, which entrains air bubbles 56 from the pocket 42 into the diverted flow stream 52. Preferably, the nozzles 37 are positioned just below the surface 16 of the hull 14 so that the inlet flow stream 50 is parallel to the flow F of the boundary layer 22 as it exits the nozzles 37.

As shown in FIG. 3, three nozzles 37 are provided in this embodiment. A greater or lesser number of nozzles 37 could be provided in different applications. The amount of convergence of each nozzle 37 (i.e., the ratio of the diameter of the nozzle throat to the diameter of the inlet) is chosen so that the inlet flow stream 50 has a sufficient exit velocity $V_4$ to entrain the air. Unnecessarily high convergence should be avoided because backpressure at the nozzle is directly proportional to the amount of convergence of each nozzle.

In order for entrainment of air to occur, the velocity $V_4$ (including direction and magnitude) of the inlet flow stream 50 must differ from the velocity $V_5$ of the diverted flow stream 52 along the free surface 45 in the area of impingement. In this embodiment, the velocity $V_5$ of the diverted flow stream 52 is directed at about a 45-degree angle relative to the velocity $V_4$ of the inlet flow stream 50 at point $F_3$.

Downstream from the entrainment device 30, the inlet flow stream 50 and the diverted flow stream 52 rejoin. Entrainment of air into the inlet flow stream 50 reduces the viscosity and density of the boundary layer flow 22. As discussed above, the reduced viscosity and density in the boundary layer results in a corresponding reduction in skin friction drag. For example, it has been estimated that a 50% air/water mixture will reduce skin friction on the hull of a submerged vessel by about 50%.

The basic function of the entrainment device 30 is to create a reduced pressure region into which air is drawn and to entrain air into the boundary layer flow 22 through turbulent mixing downstream form the entrainment device 30. In this embodiment, such turbulent mixing is created by directing a second flow stream through the air at an increased velocity. The location, size, and arrangement of the entrainment device 30 will, of course, depend upon the size and configuration of the vessel 10 and the hull 14. In most applications, it will be desirable to have an array of entrainment devices 30 arranged in a row across the hull 14 at a location near the bow 18. Such an array of entrainment devices 30 is preferably transverse to the direction D of propulsion of the vessel 10. The number of entrainment devices 30 will depend upon the width of the hull 14. In some applications it may be desirable to include multiple rows of entrainment devices 30, particularly in vessels having extremely long hulls.

Figure 5:
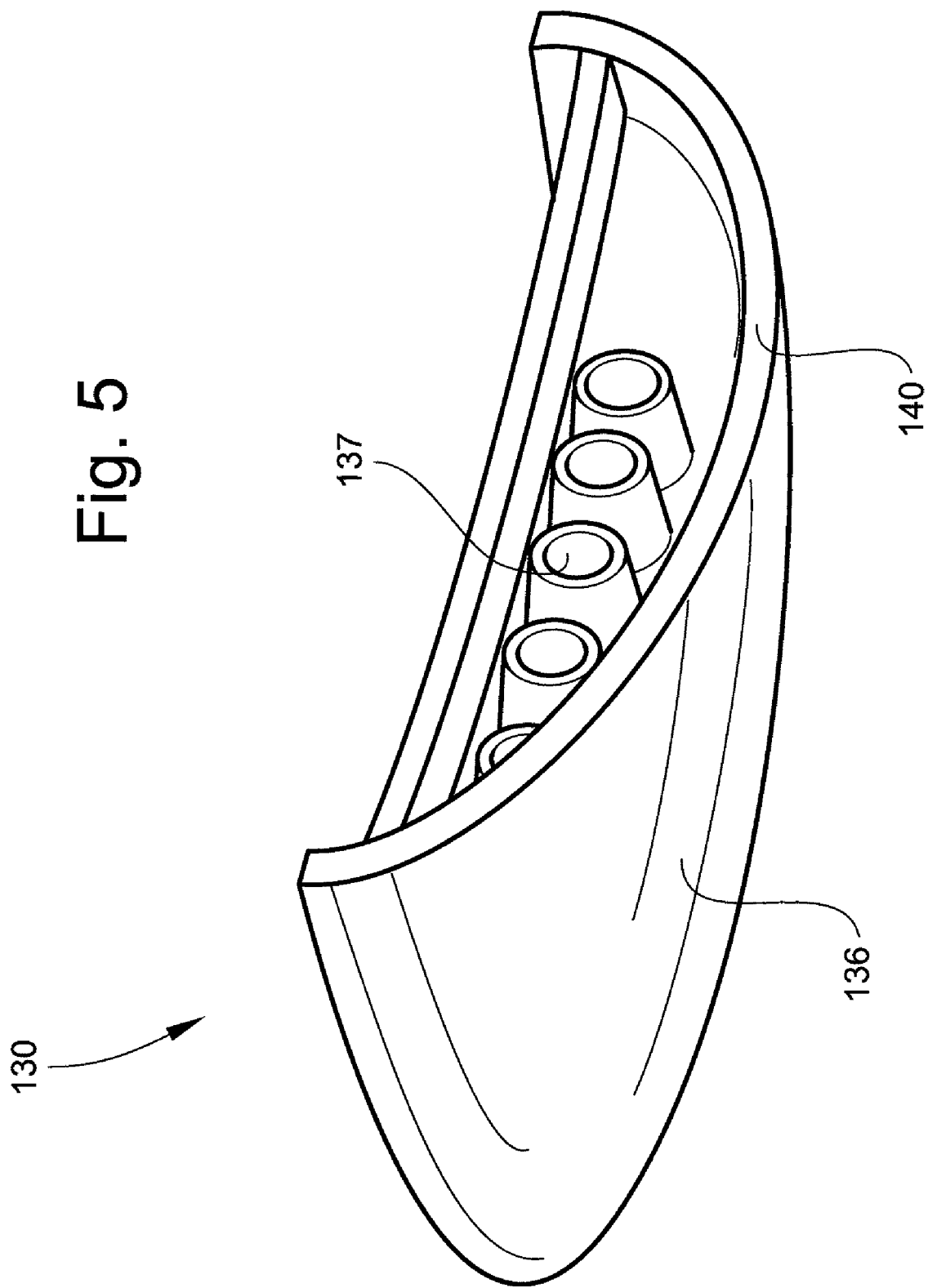
FIG. 5 shows a second embodiment of the entrainment device, shown from the underside and rear.
Figure 6:
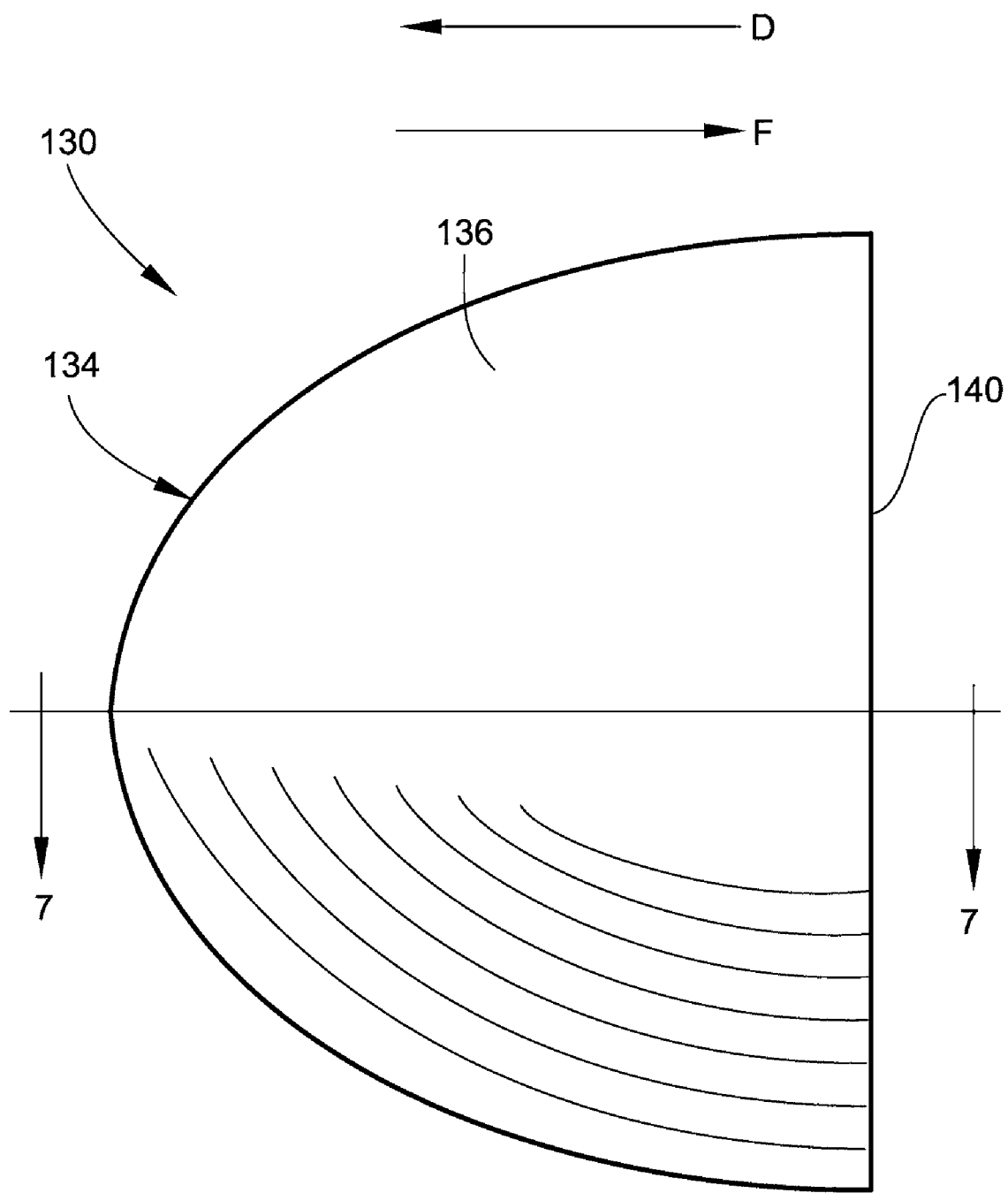
FIG. 6 shows a bottom view thereof.
Figure 7:
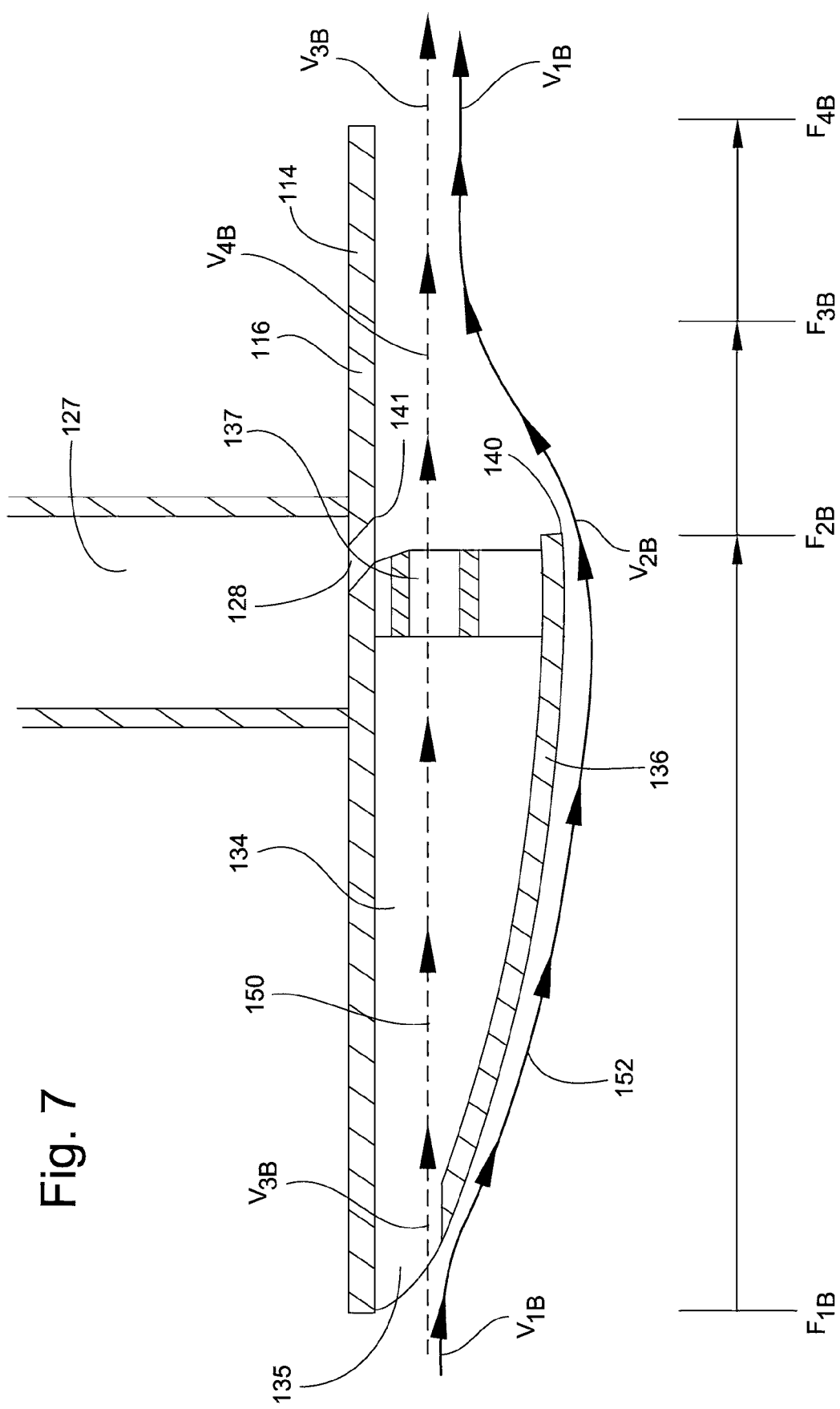
FIG. 7 shows a sectional view thereof taken along line 7-7 of FIG. 6.

Different configurations could be used for the entrainment device 30, such as the alternate embodiment shown in FIGS. 5-7. In FIGS. 5-7, features that correspond to features shown in the first embodiment of the entrainment device 30 are designated by reference numerals that are increased by a factor of 100. For example, the second embodiment of the entrainment device is designated by reference numeral 130. The velocity reference points ($V_1$ through $V_4$) and flow reference points ($F_1$ through $F_4$) in FIG. 4 correspond to $V_{1B}$ through $V_{4B}$ and $F_{1B}$ through $F_{4B}$, respectively, in FIG. 7.

The entrainment device 130 is similar to the first embodiment of the entrainment device 30, in that it includes an inlet 134, a diverting member 136, and a plurality of nozzles 137. The primary differences between the second embodiment of the entrainment device 130 and the first embodiment 30 are in the shallower slope of the diverting member 136 and the shape of the inlet 134. These differences are best seen in FIG. 7.

Yet another embodiment of the invention is shown in FIGS. 8-9, in which features that correspond to features shown in the first embodiment of the entrainment device 30 are designated by reference numerals that are increased by a factor of 200. For example, the second embodiment of the entrainment device is designated by reference numeral 230. The velocity reference points ($V_1$ through $V_4$) and flow reference points ($F_1$ through $F_4$) in FIG. 4 correspond to $V_{1C}$ through $V_{4C}$ and $F_{1C}$ through $F_{4C}$, respectively, in FIG. 7.

The entrainment device 230 shown in FIGS. 8-9 functions in essentially the same way as the two other embodiments described herein, but is adapted for use in high-speed power boats. The entrainment device 230 includes a vent 226 which comprises a channel that preferably extends transversely across the hull 214 of the vessel 10. The vent 226 extends to a point above the water line 270, so that air can flow into and out of the vent 226.

In this embodiment, the trailing edge 240 of the flow diverter 236 coincides with the front edge of the vent 226 and the downstream leading edge 241 of the hull 214 coincides with the rear edge of the vent 226. The flow diverter 236 does not protrude downwardly from the surface 216 of the hull 214. Instead, the downstream leading edge 241 of the hull 214 is recessed relative to the trailing edge 240 of the flow diverter 236, i.e., it is positioned slightly higher in the water than the trailing edge 240 of the flow diverter 236.

As in the other embodiments of the present invention, this embodiment includes an inlet 234 that directs the inlet flow stream 250 through a nozzle 237. The inclusion of the inlet 234 and nozzle 237 results in impingement mixing, and therefore, much more air entrainment than a conventional ventilated step chine.

The entrainment device of the present invention could also be used in applications other than surface vessels. For example, the entrainment device could be used to reduce friction in pipe flow by placing entrainment devices on the inner surface of the pipe.

It is recognized by those skilled in the art, that changes may be made to the above-described embodiments of the invention without departing from the broad inventive concept thereof. It is understood, therefore, that this invention is not limited to the particular embodiments disclosed but is intended to cover all modifications which are in the spirit and scope of the invention.

What is claimed is:

1. A vessel comprising:
   a hull designed to be propelled through a primary fluid, the hull having a surface that is at least partially submerged in the primary fluid; and
   at least one entrainment device attached to the surface, each of the at least one entrainment device including:
   an inlet through which a first portion of the primary fluid flows, the first portion of the primary fluid entering the inlet through a first opening and exiting the inlet through at least one nozzle;
   a flow diverting member located downstream from the first opening of the inlet, a second portion of the primary fluid flowing over the flow diverting member;
   a second opening that enables the secondary fluid to flow into a first region, the second opening being located at or downstream from the flow diverting member and between the surface of the object and the second portion of the primary fluid; and
   a free surface located where the second portion of the primary fluid abuts the first region; and wherein the at least one nozzle directs the first portion of the primary fluid through the free surface, so that at least a portion of the secondary fluid is entrained into a portion of the primary fluid wherein the flow diverting member comprises a trailing edge and the at least one nozzle comprises a lowermost portion, and the trailing edge of the flow diverting member and the lowermost portion of the at least one nozzle are spaced apart.

2. The vessel of claim 1, wherein the at least one entrainment device comprises a plurality of entrainment devices.

3. The vessel of claim 2, wherein the hull is designed to be propelled in a direction D and the plurality of entrainment devices are arranged in an array that is transverse to the direction D of propulsion.

4. The apparatus of claim 1, wherein the second opening is located downstream from the at least one nozzle.

5. The apparatus of claim 1, wherein the at least one nozzle comprises a plurality of nozzles.

6. The apparatus of claim 1, wherein the density of the secondary fluid is less than the density of the primary fluid.

7. The apparatus of claim 1, wherein the flow diverting member includes a trailing edge at a downstream end of the flow diverting member, the surface of the object includes a downstream leading edge located downstream from the second opening, and the trailing edge is positioned below the downstream leading edge.

8. The apparatus of claim 7, wherein the first portion of the primary fluid exits the at least one nozzle along a path that is parallel to the surface of the object.

9. The apparatus of claim 1, wherein at least a portion of the inlet is recessed into the surface of the hull.

10. The apparatus of claim 1, wherein each of the at least one nozzle is a converging nozzle.

11. An apparatus that entrains a secondary fluid into a primary fluid flow while the primary fluid flows along a surface of an object, the apparatus comprising:

an inlet through which a first portion of the primary fluid flows, the first portion of the primary fluid entering the inlet through a first opening and exiting the inlet through at least one nozzle;

a flow diverting member located downstream from the first opening of the inlet, a second portion of the primary fluid flowing over the flow diverting member;

a second opening that enables the secondary fluid to flow into a first region, the second opening being located at or downstream from the flow diverting member and between the surface of the object and the second portion of the primary fluid;

a free surface consisting of the area in which the second portion of the primary fluid abuts the first region;

wherein the at least one nozzle directs the first portion of the primary fluid through the free surface, so that at least a portion of the secondary fluid is entrained into a portion of the primary fluid; and wherein at least a portion of the inlet is recessed into the surface of the object.

12. The apparatus of claim 11, wherein the second opening comprises a channel that extends transversely across the surface of the object.

13. The apparatus of claim 12, wherein the flow diverting member includes a trailing edge at a downstream end of the flow diverting member, the surface of the object includes a downstream leading edge located downstream from the second opening, and the trailing edge is positioned below the downstream leading edge.

14. The apparatus of claim 11, wherein the density of the secondary fluid is less than the density of the primary fluid.

15. The apparatus of claim 11, wherein each of the at least one nozzle is a converging nozzle.

16. The apparatus of claim 11, wherein the at least one nozzle is directed substantially parallel to the surface of the object.

17. An apparatus that entrains a secondary fluid into a primary fluid flow while the primary fluid flows along a surface of an object, the apparatus comprising:

an inlet through which a first portion of the primary fluid flows, the first portion of the primary fluid entering the inlet through a first opening and exiting the inlet through at least one nozzle;

a flow diverting member located downstream from the first opening of the inlet, a second portion of the primary fluid flowing over the flow diverting member;

a second opening that enables the secondary fluid to flow into a first region, the second opening being located at or downstream from the flow diverting member and between the surface of the object and the second portion of the primary fluid;

a free surface consisting of the area in which the second portion of the primary fluid abuts the first region;

wherein the at least one nozzle directs the first portion of the primary fluid through the free surface, so that at least a portion of the secondary fluid is entrained into a portion of the primary fluid; and wherein the flow diverting member comprises a leading edge and the at least one nozzle comprises a lowermost an uppermost portion, wherein the leading edge of the flow diverting member is located no lower than the lowermost uppermost portion of the nozzle.

18. The apparatus of claim 17, wherein the at least one nozzle is directed substantially parallel to the surface of the object.

19. The apparatus of claim 17, wherein the flow diverting member includes a trailing edge at a downstream end of the flow diverting member, the surface of the object includes a downstream leading edge located downstream from the second opening, and the trailing edge is positioned below the downstream leading edge.

20. The apparatus of claim 17, wherein the density of the secondary fluid is less than the density of the primary fluid.

21. The apparatus of claim 17, wherein at least a portion of the inlet is recessed into the surface of the object.

22. The apparatus of claim 17, wherein each of the at least one nozzle is a converging nozzle.

23. An apparatus that entrains a secondary fluid into a primary fluid flow while the primary fluid flows along a surface of an object, the apparatus comprising:

an inlet through which a first portion of the primary fluid flows, the first portion of the primary fluid entering the inlet through a first opening and exiting the inlet through at least one nozzle;

a flow diverting member located downstream from the first opening of the inlet, a second portion of the primary fluid flowing over the flow diverting member;

a second opening that enables the secondary fluid to flow into a first region, the second opening being located at or downstream from the flow diverting member and between the surface of the object and the second portion of the primary fluid;

a free surface consisting of the area in which the second portion of the primary fluid abuts the first region;

wherein the at least one nozzle directs the first portion of the primary fluid through the free surface, so that at least a portion of the secondary fluid is entrained into a portion of the primary fluid; and wherein the flow diverting member and at least one nozzle are configured so that the first region extends below the at least one nozzle.

24. The apparatus of claim 23, wherein the flow diverting member includes a trailing edge at a downstream end of the flow diverting member, the surface of the object includes a downstream leading edge located downstream from the second opening, and the trailing edge is positioned below the downstream leading edge.

25. The apparatus of claim 23, wherein the density of the secondary fluid is less than the density of the primary fluid.

26. The apparatus of claim 23, wherein at least a portion of the inlet is recessed into the surface of the object.

27. The apparatus of claim 23, wherein each of the at least one nozzle is a converging nozzle.

* * * * *